Sept. 21, 1943.　　　C. F. RUBSAM　　　2,329,854
COUNTERBALANCING MEANS FOR AUTOMOBILE WHEELS
Filed Nov. 13, 1940

Inventor:
CHARLES F. RUBSAM
By Harness, Dickey & Pierce,
Attorneys.

UNITED STATES PATENT OFFICE 2,329,854

COUNTERBALANCING MEANS FOR AUTOMOBILE WHEELS

Charles F. Rubsam, Tenafly, N. J.

Application November 13, 1940, Serial No. 365,527

1 Claim. (Cl. 301—5)

This invention relates to balancing counterweights for automobile wheels.

The main objects of this invention are to provide a counter-weight applied to an automobile wheel at a location such that it will produce dynamic balance as well as static balance to the wheel assembly; to provide a wheel assembly with a counter-weight applied thereto at a location substantially in a plane which is perpendicular to the axis of rotation, and which passes through the center of mass of the rotating assembly; to provide a wheel balancing counter-weight and attaching clip of extremely simple and economical construction; and to provide a wheel balancing counter-weight and attaching clip which is readily adaptable and attachable to automobile wheels of modern, current design and construction.

An illustrative embodiment of this invention is shown in the accompanying drawing, in which.

Figure 1:
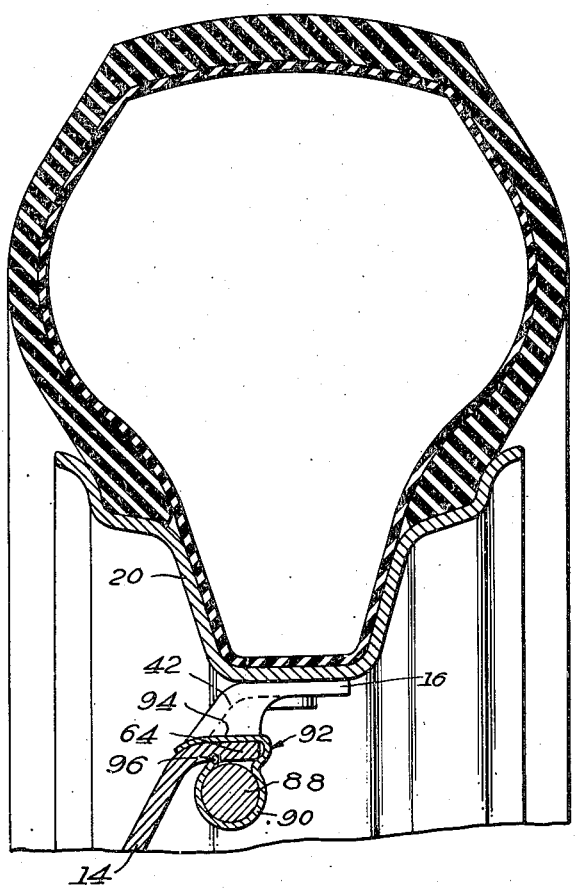
Fig. 1 is a fragmentary sectional view showing a counter-weight detachably attached at a location substantially in the middle of the drop-center rim, inside of the periphery of the wheel disc and substantially in a plane perpendicular to the axis of rotation of the wheel assembly and in the center of its rotating mass.
Figure 2:
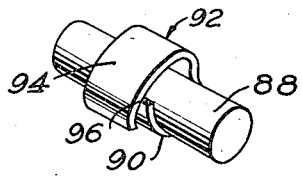
Fig. 2 is a view in perspective of the counter-weight and attaching clip illustrated in Fig. 1.

The embodiment and exemplification of wheel balancing counter-weight disclosed in the present application is an outgrowth and continuation of my previous developments in the same field, as shown by my United States Patents Nos. 2,137,415 and 2,137,416, which issued on November 22, 1938.

The axially extending flange 16 of a wheel disc 14 is depressed inwardly at spaced intervals about its periphery so as to form openings 42 between the inner periphery of a drop-center rim 20 and the wheel disc 14.

In the embodiment shown in the drawing a counter-weight 88 of elongated cylindrical shape has its medial part surrounded for the major portion thereof by one end 90 of a flat strap-like spring steel clip generally designated 92. The other end 94 of the clip 92 is adapted to be passed through the opening 42 and conforms to the shape of the outer side of the disc flange 64 so as to snugly embrace the same and yieldingly grip the flange to retain the counter-weight in position. The end of the clip extends tangentially with respect to the counter-weight 88 and terminates in a sharp cornered shoulder 96, which is positioned so as to bite into and engage the metal on the inner side of the flange 64, thereby preventing accidental dislodgment of the clip and counter-weight when assembled on the disc flange.

In this assembled condition, the distance between the protruding edge 96 and the underside of the clip portion 94 is less than the thickness of the flange 64 to which it is assembled, whereby the sharp edge 96 is spring pressed or urged into biting engagement with the flange 64 at all times when assembled thereon.

The shoulder 96 of the clip is so positioned that centrifugal forces acting on the counter-weight urges the engagement of the shoulder against the surface of the disc flange in such manner that the faster the wheel is rotated, the tighter the counter-weight will be automatically held in position on the disc flange.

In the use of counter-weight herein illustrated, the wheel to be balanced is first tested to determine the amount of "out of balance," and then a counter-weight of appropriate mass is placed on the wheel assembly, the point of application or location of the counter-weight being substantially in a plane perpendicular to the axis of rotation and in the center of mass of the rotating unit. It is thus possible to apply only one counter-weight and the application of this counter-weight will not introduce any dynamically unbalanced condition when the unit is rotated.

In instances where the exact point of application of the counter-weight should be between two of the openings 42 formed around the wheel disc and rim, then in such instances it may be necessary to divide the amount of the weight between two units which are secured through adjacent openings 42. If these openings are spaced sufficiently close, this procedure will not be necessary and a single counter-weight of correct mass may be applied to rectify the "out of balance" condition.

What is claimed is:

In a balancing means for an automobile wheel, a wheel disc and rim assembly, a flange on said disc adjacent said rim, a flat, strap-like, spring steel clip having one end shaped substantially to the cross-sectional contour of said flange and adapted to yieldingly embrace the same, the other end of said clip being shaped to surround and embrace a counterweight, and a counter-weight mounted in said clip, the terminating end of that portion of the clip surrounding the counterweight being shaped and disposed so as to engage said flange to prevent accidental dislodgment of said clip.

CHARLES F. RUBSAM.